May 16, 1967    F. MEYER    3,320,112
MACHINE FOR MAKING FOILS OR WEBS OF RUBBER
OR RUBBER-LIKE MATERIAL
Filed July 15, 1963
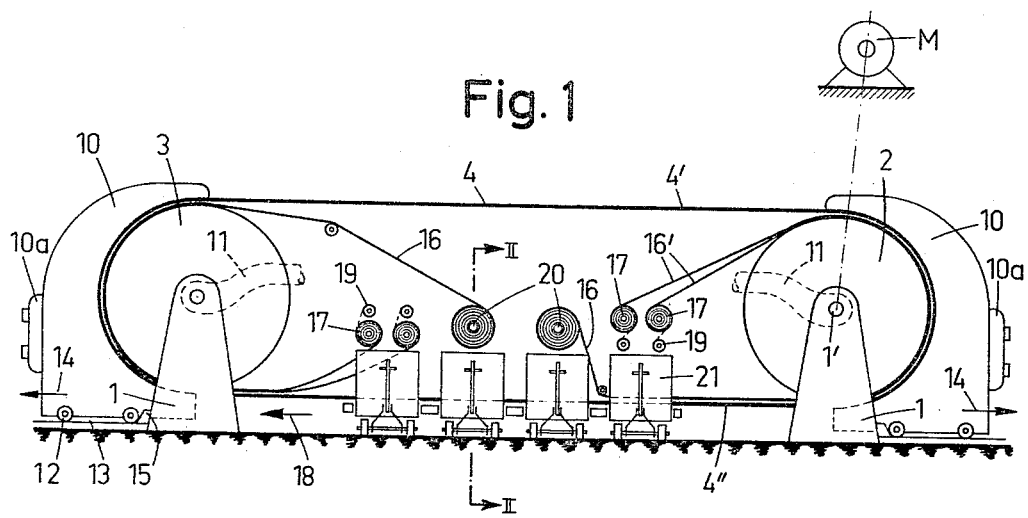
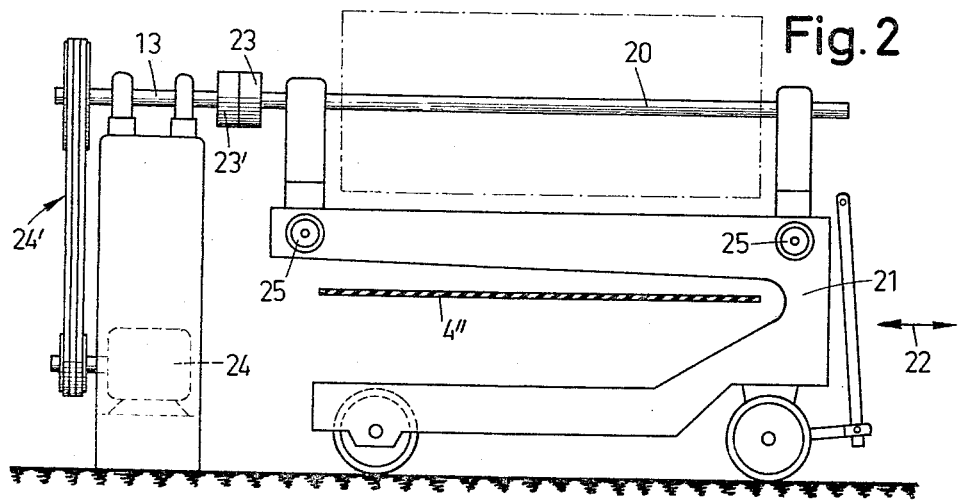
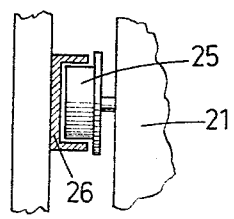
INVENTOR
Friedrich Meyer
BY
Walter Becker
Patent Agent United States Patent Office 3,320,112
Patented May 16, 1967

3,320,112
MACHINE FOR MAKING FOILS OR WEBS OF RUBBER OR RUBBER-LIKE MATERIAL
Friedrich Meyer, Gehrden, Hannover, Germany, assignor to Continental Gummi-Werke Aktiengesellschaft, Hannover, Germany
Filed July 15, 1963, Ser. No. 295,168
6 Claims. (Cl. 156—543)

The present invention relates to a machine for making foils or webs of rubber or rubber-like material in a continuous operation by employing a heatable drum and an endless pressure belt rotating with the drum.

It is an object of the present invention to improve the above-mentioned machine, and in particular, the efficiency thereof.

It is also an object of this invention to provide a machine for making foils or webs of rubber or rubber-like material by means of heatable drums and an endless pressure belt passing thereover which will facilitate the handling of the supply bodies and winding-up bodies used in connection with said machine.

It is another object of this invention to provide a machine as set forth in the preceding paragraphs in which the said supply bodies and winding-up bodies, when being exchanged, do not interfere with said pressure belt.

These and other objects and advantages of the invention will appear more clearly from the following specification in connection with the accompanying drawings, in which:

FIGURE 1 diagrammatically illustrates a side view of a machine according to the present invention for making foil-shaped or web-shaped rubber articles in a continuous process;

FIGURE 2 is a section along the line II—II of FIGURE 1;

FIGURE 3 shows in detail guiding means employed in connection with the structure of FIGURE 2.

The present invention is characterized primarily in that one or more heatable drums are provided which have looped around the pressing belt and are adapted individually to be supplied with the material to be treated. Thus, for instance, two heatable rotatable drums of substantially the same size may be arranged in spaced relationship to each other while the pressing belt is looped therearound in the manner of a belt transmission. The spacing between said heatable drums is so selected that both drums can be individually supplied with material to be treated and the treated product can be withdrawn individually from each drum.

In order to provide for the space necessary for the installation of the two winding-up and unwinding stations, and in order to assure the distance between the two drums which are passed around by the pressing belt which is under strong pulling stress, according to a further development of the present invention, the pairs of drums and supporting stations are interconnected by braces.

The handling of the winding-off and winding-up bodies is greatly facilitated, according to the present invention, by an arrangement which permits the manual displacement of said bodies so that they will easily be accessible, and which will facilitate their exchange. The supply and winding-up bodies are journalled on carriages which may be easily displaced in a direction transverse to the longitudinal extension of the above-mentioned pressure belt.

Referring now to the drawings in detail and FIG. 1 thereof in particular, the arrangement illustrated therein represents a vulcanizing machine for making foil-shaped or web-shaped rubber bodies in a continuous process. The machine comprises primarily two stands 1 having journalled therein heatable drums 2 and 3 respectively around which there is passed a pull-resistant pressing belt 4, preferably of steel. This belt is so arranged that the upper section passes along the shortest path from drum 2 to drum 3 or vice versa. The drums 2 and 3 are adapted to be rotated in any convenient manner, for instance, by a motor M so that, for instance, the belt 4 may rotate in the direction of the arrow 18.

Between the two drums 2 and 3 and the upper and lower section of belt 4 there are for each drum 2 and 3 provided supply bodies 17 for the material to be vulcanized. Each drum 2 and 3 also has associated therewith bodies 20 for receiving the vulcanized foils or web material. Thus, each drum 2, 3 is supplied individually with the material to be treated. Thus, the material to be treated by drum 2 passes from the supply body 17 to the upper range of the drum 2 between the drum surface and the pressing belt 4, and leaves the lower portion of drum 2 from where it passes to the winding-up body 20. A corresponding action, of course, takes place with drum 3.

According to FIG. 1, two webs 16' are supplied to the drums, and accordingly each drum 2, 3 has associated therewith two supply rollers 17. The combining or laminating of the individual webs 16' to a web 16 is effected by vulcanization during the passage of said webs 16' over the drums 2 and 3 and during the movement of the steel belt 4 in the direction of the arrow 18. The supply rollers 17 have associated therewith winding-up bodies 19 for receiving the separating web or the like which previously was spooled on winding bodies or rollers 17 together with the respective web in order to prevent the windings on said rollers 17 of the material to be treated from sticking to each other. Thus, while the web material is spooled off from the rollers 17, the said separating web is spooled onto the winding bodies 19.

When the supply rollers 17 have been emptied, corresponding lengths of webs have been wound upon the winding bodies 20. At this time all winding bodies 17, 20 and 19 have to be removed and replaced by new ones. In order to facilitate this operation, the said winding bodies are mounted on carriages 21 which, when looking in the direction of the lower belt section 4" are U-shaped in such a way that the respective carriage 21, together with the winding bodies, may selectively be moved in and out of the device in the direction of the double arrow 22, i.e. transverse to the longitudinal direction of the endless belt 4. This can be effected without interfering with or contacting the lower section 4" of the belt 4.

The rear end of the winding body 20 is equipped with a clutch member 23 adapted to be engaged with a corresponding clutch member 23' of a drive shaft 13 which is drivingly connected through a belt transmission 24' with a motor 24. The drive for the winding body 20 is thus stationarily arranged and can be made effective by engaging the clutch 23, 23' when the carriage 21 has been moved into its operative position according to FIGS. 1 and 2. The carriage may, of course, be locked in its operative position, for instance, by a brake of any standard type.

In order to assure that the carriages 21, when being moved into the device, will immediately occupy their prescribed position, in other words, in order quickly and safely to bring the two clutch members 23 and 23' into engagement with each other, both sides of the carriage, at the front and rear thereof, are provided with guiding rollers 25 adapted to engage stationary guiding rails 26 of the machine (shown in FIG. 3 only). It is, of course, to be understood that additional means, such as abutment means, may be provided which will assure the prescribed distance between the carriage 21 and the stationary drive 24 and 24'.

The carriages 21, when moved out of the machine according to FIG. 1, may be moved to any desired place in order easily to effect the exchange of the winding or roller bodies for carrying out the next working cycle. It may also be mentioned that the number of webs 16' may be selected according to the requirements and that, accordingly, any desired number of winding bodies 17 may be selected in conformity with the number of superimposed web layers.

The supporting portions or bearings 1' of the stands 1 for the axles of the drums 2, 3 are interconnected by braces 11 at both sides of the drums 2, 3, the brace in the rear only being shown, while the brace in the front has been omitted. These braces 11 make possible not only a high initial pulling stress of the pressing belt 4 but also permit the selection of a relatively light foundation for the stands 1.

In order to be able to carry out an intensive heat treatment and accordingly a fast vulcanization, a radiation heating system is provided in a crescent-shaped housing 10 for heating the respective belt section contacting the drum surface. The heating system itself may be of any standard type, electrical or steam type for instance of the type used in connection with garment pressing machines and disclosed in U.S. Patent No. 2,759,644, FIG. 6

The drums, incidentally, may have a diameter of, for instance, 3 meters. Mounted on the back side of the housing 10 is a control-board 10a with any standard means for controlling the heating system in housing 10, for instance valves with steam is used or switches with electrical heating elements are used.

As will be seen from FIG. 1, the housing 10 is equipped with wheels or rollers 12 guided on rails 13 extending substantially perpendicularly to the axes of the drums 2, 3. Thus, the housing 10 together with the heat radiators and the switchboard 10a may be displaced in the direction of the arrow 14 in order easily to permit installation work or inspection of the heating system in housing 10. When such work has been completed, the housing 10 is again returned to its operative position in which it may be locked by any standard means as, for instance, a brake acting on said rollers 12.

The displaceability of the housing 10 in the direction of the arrow 14 also makes possible the mounting of heater means in those sections of the drum surface where the belt 4 moves onto the drum and leaves the drum. If desired, the housing 10 may be extended without difficulty toward the top and toward the bottom in the direction of the belt 4, so that with a corresponding mounting of the heating means, the belt 4 may be heated already when it has not yet reached the respective drum 2, 3, i.e. has not yet contacted the material to be vulcanized.

It is, of course, to be understood that the present invention is, by no means, limited to the particular construction and arrangement shown in the drawing, but also comprises any modifications within the scope of the appended claims.

What I claim is:

1. In an apparatus for the treatment in a continuous operation of web and foil material of indeterminate length, which includes: two stands spaced from each other in horizontal direction, a first and a second heatable drum respectively rotatably supported by said stands and provided with an outer smooth cylindrical surface, driving means drivingly connected to one of said drums, endless pull-resistant pressure belt means passed around said drums along the shortest path therebetween so as to encompass said drums over approximately half the circumference of each of said drums, two sets of rolls independent of each other and arranged between and respectively pertaining to said first and second drums, each of said sets including a supply roll for feeding material to and into frictional engagement with the respective drum to which the respective supply roll pertains and between the respective drum and the belt portion encompassing the latter, each of said sets also including a receiving roll for receiving the material passed from the supply roll of the same set of rolls over the respective drum pertaining thereto, and driving means independent of each other and respectively drivingly directed to and disengageable from said receiving rolls.

2. An apparatus according to claim 1, in which each of said sets of rolls includes two supply rolls operable simultaneously to feed web material in superimposed arrangement into the bite between the respective drum and the said endless belt means for laminating the material fed into said bite of the respective drum and said endless pressing pressure belt means.

3. An apparatus according to claim 1, which includes a plurality of carriage means respectively supporting said supply and receiving rolls and being movable in a direction transverse to the direction of movement of said belt means.

4. An apparatus according to claim 3, in which each of said carriage means comprises a first clutch member drivingly connected to the rollers supported thereby, and a plurality of stationarily arranged driving means each including a second clutch member adapted selectively to be engaged with and disengaged from the respective first clutch member.

5. An apparatus according to claim 3, in which each of said carriage means has a frame of U-shaped profile for receiving a portion of said pressure belt means between the legs of said U-shaped profile.

6. An apparatus according to claim 3, in which said carriage means are provided with laterally arranged guiding rollers, and stationary guiding rails extending in a direction transverse to the direction of travel of said pressure belt means for guiding said guiding rollers.

References Cited by the Examiner

UNITED STATES PATENTS 981,981   1/1911   Crook _____ 156—543

EARL M. BERGERT, *Primary Examiner.*

M. L. KATZ, *Assistant.*